United States Patent [19]

Yeager

[11] 4,446,829
[45] May 8, 1984

[54] ROTARY INTERNAL COMBUSTION ENGINE

[76] Inventor: Zema O. Yeager, 19 Lake Rd., East Hampton, Conn. 06420

[21] Appl. No.: 328,816

[22] Filed: Dec. 9, 1981

Related U.S. Application Data

[63] Continuation-in-part of Ser. No. 223,042, Jan. 7, 1981, abandoned.

[51] Int. Cl.³ .............................................. F02B 53/00
[52] U.S. Cl. ..................................... 123/244; 418/248
[58] Field of Search .................. 123/228, 244; 418/248

[56] References Cited

U.S. PATENT DOCUMENTS

| | | | |
|---|---|---|---|
| 2,055,137 | 9/1936 | Sherman | 418/248 X |
| 3,164,139 | 1/1965 | Appleton | 123/228 |
| 3,539,280 | 11/1970 | Ravera | 123/244 X |
| 3,921,596 | 11/1975 | Schulz | 123/244 |
| 4,009,690 | 3/1977 | Moran | 123/244 |
| 4,178,900 | 12/1979 | Carson | 123/244 |

Primary Examiner—Michael Koczo
Attorney, Agent, or Firm—McCormick, Paulding & Huber

[57] ABSTRACT

A rotary internal combustion engine has a block assembly and a rotor journalled for coaxial rotation within a cylindrical chamber in the block assembly. Angularly spaced lobes on the rotor separate angularly spaced pockets which are defined by the rotor. The pockets cooperate with the chamber to define compression and combustion chambers as the rotor rotates within the chamber. Angularly spaced apart seal assemblies pivotally supported in recesses in the block assembly are biased into sealing engagement with the rotor. Each seal assembly includes inner and outer seal members. Each inner seal member is pivotally movable relative to its associated outer seal member and is movable into and out of a channel which is formed in the rotor and which partially defines the combustion chamber.

33 Claims, 34 Drawing Figures

ROTARY INTERNAL COMBUSTION ENGINE

CROSS REFERENCE TO RELATED APPLICATION

This is a continuation-in-part of application Ser. No. 223,042, filed Jan. 7, 1981 and now abandoned.

BACKGROUND OF THE INVENTION

This invention relates in general to internal combustion engines and deals more particularly with an improved rotary engine of the type which has an engine block and a rotor journalled for rotation within the block and coacting with the block to define compression and combustion chambers therebetween.

In engines of the aforedescribed general type problems are encountered in providing effective seals to achieve and maintain desired compression ratio and avoid fuel and air leakage past the seals. Further problems are encountered in providing for efficient intake of air-fuel mixture and in completely scavenging the products of combustion from the combustion chamber upon completion of the ignition cycle and before the next charge of fuel-air mixture enters the chamber. Incomplete scavenging causes dilution of the fuel-air mixture and results in incomplete combustion. Accordingly, it is the general aim of the present invention to provide an improved lightweight rotary internal combustion engine which is efficient and durable and which overcomes the aforesaid general problem.

SUMMARY OF THE INVENTION

In accordance with the invention a rotary internal combustion engine is provided which has a block assembly and a rotor journalled for coaxial rotation within a cylindrical chamber in the block assembly. Angularly spaced lobes on the rotor separate angularly spaced pockets defined by the rotor. One of the pockets is defined by a portion of the peripheral surface of the rotor. Another of the pockets is formed by a radially outwardly opening channel in the rotor. Angularly spaced apart seal assemblies pivotally supported in recesses in the block assembly have sealing surfaces biased into sealing engagement with the rotor. Each seal assembly includes inner and outer seal members. Each inner seal member pivots relative to its associated outer seal member and is movable into and out of the channel and sealingly engageable with associated walls of the channel as the rotor rotates within the cylindrical chamber. Means are provided for biasing the seal assemblies into sealing engagement with the rotor.

BRIEF DESCRIPTION OF THE DRAWINGS

FIG. 25 is a top view of the outer exhaust seal member as shown in FIG. 24.

DETAILED DESCRIPTION OF PREFERRED EMBODIMENT

Turning now to the drawings, a rotary internal combustion engine embodying the present invention and indicated generally by the reference numeral 10 has a block assembly or housing indicated generally at 12 and a rotor designated generally by the numeral 14 and supported for rotation with the housing. The rotor cooperates with the housing to alternately define compression and combustion chambers, respectively generally indicated at 16 and 18. Angularly spaced seal assemblies pivotally supported within recesses in the housing 12 and indicated generally at 20 and 22, are biased into sealing engagement with the rotor and cooperate with it to seal the combustion and compression chambers as the rotor rotates within the housing. The engine of the present invention is a four-cycle engine and has separate intake, compression, power and exhaust cycles which occur during each complete revolution of the rotor 14. The illustrated engine 10 provides a single power cycle during each complete revolution. However, it will be obvious that such an engine may be arranged to provide additional compression and combustion chambers so that a plurality of power cycles occur during each revolution of the rotor and such modified forms of the engine are contemplated within the scope of the invention.

Considering the engine 10 in further detail, the housing 12 includes an engine block 24 and two end plates or heads 26 and 28 which are fastened in sealing relation to opposite ends of the block 24, using suitable gaskets, substantially as shown. The block 24 is generally cylindrical and has a cylindrical bore 30 which extends through it. Angularly spaced recesses 32 and 34 formed in the engine block 24 extend generally radially through it and communicate with the bore 30 to contain the seal assemblies 20 and 22. An angularly spaced series of cooling passageways 36, 36 formed in the block are or may be interconnected with associated passageways formed in the heads 26 and 28, but not shown. The heads cooperate with the bore 30 to define a generally cylindrical chamber 38 which contains the rotor 14. A coaxial arcuate intake slot 40 extends through the head 28 between the recesses 32 and 34 and communicates with the chamber 38. The head 28 also has a port 41 which opens through it for a purpose which will be hereinafter further evident.

Figures 1, 2, 7, 8, 9, 10, 11, 12:
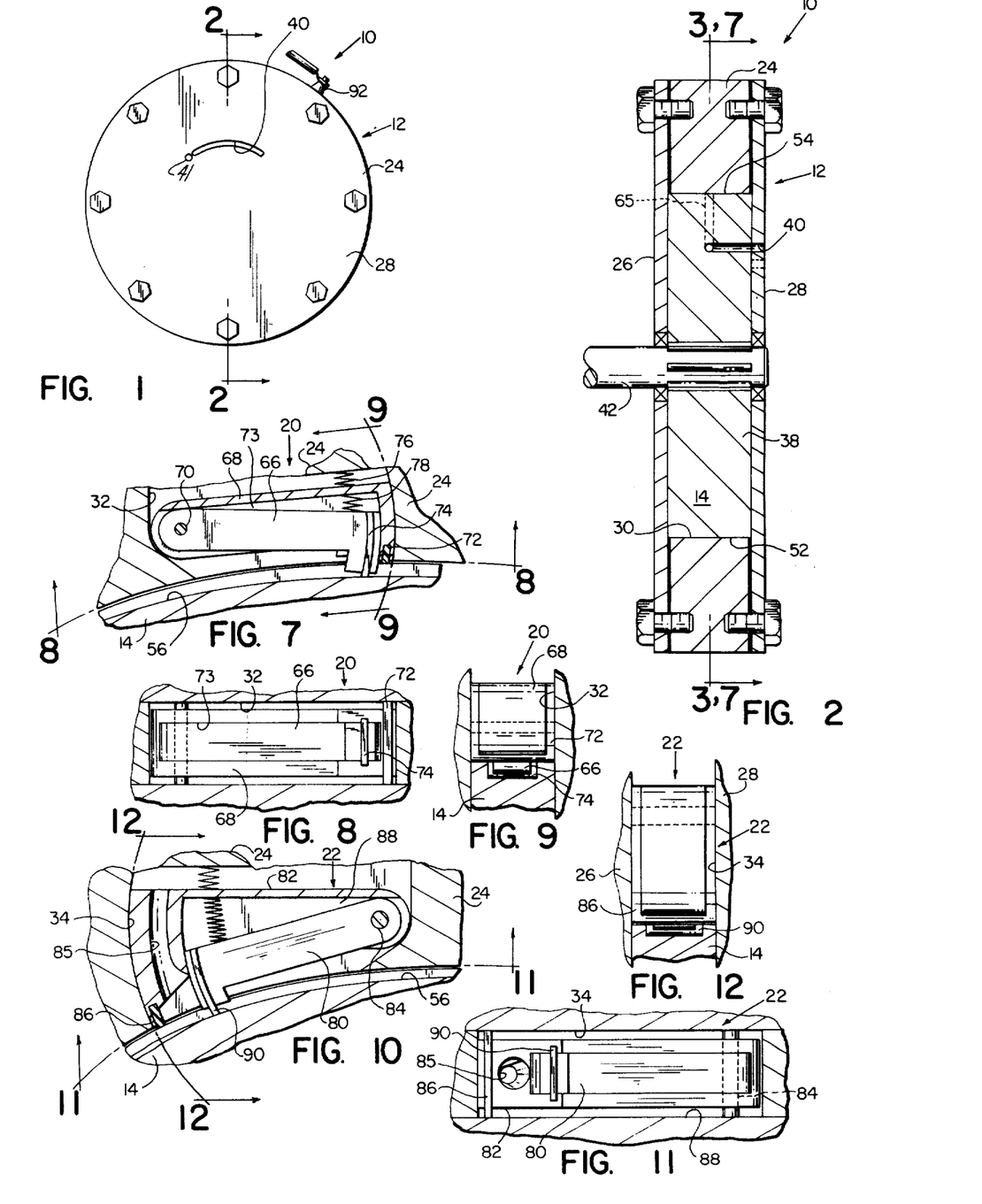
FIG. 1 is a side elevational view of a rotary internal combustion engine embodying the present invention.
FIG. 2 is a somewhat enlarged sectional view taken along the line 2—2 of FIG. 1.
FIG. 7 is a somewhat further enlarged fragmentary sectional view taken generally along the line 7—7 of FIG. 2 and shows one of the seal assemblies, the inner seal being shown in full.
FIG. 8 is a fragmentary bottom view of the seal assembly shown in FIG. 7 as viewed generally along the line 8—8 of FIG. 7.
FIG. 9 is a fragmentary sectional view taken generally along the line 9—9 of FIG. 7.
FIG. 10 is similar to FIG. 7, but shows another seal assembly.
FIG. 11 is a bottom view of the seal assembly shown in FIG. 10 as viewed generally along the line 11—11 of FIG. 10.
FIG. 12 is a fragmentary sectional view taken generally along the line 12—12 of FIG. 10.
Figure 3:
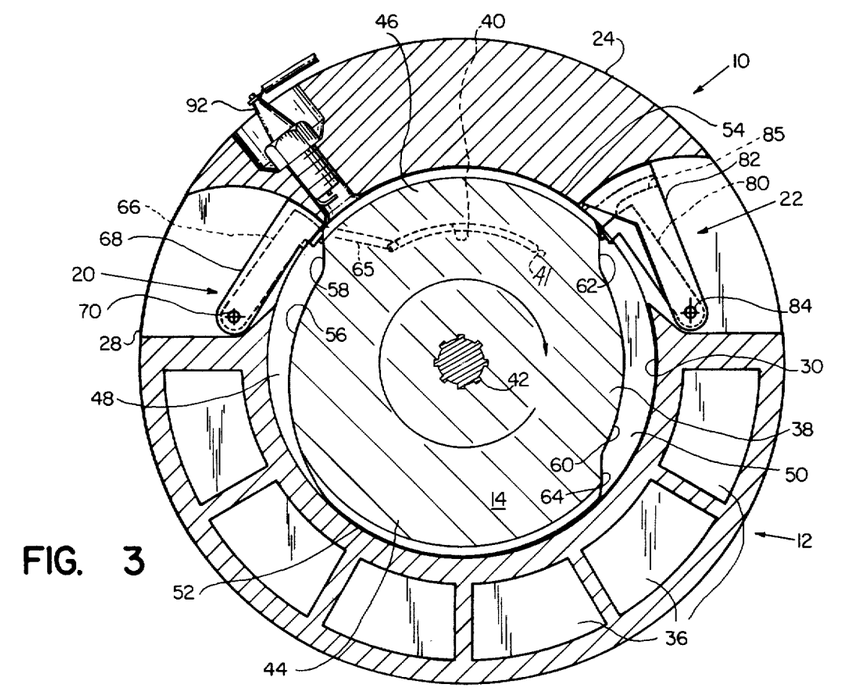
FIG. 3 is a somewhat schematic sectional view taken along the line 3—3 of FIG. 2 and shows the position of the rotor at the beginning of the intake cycle.

The rotor 14 is supported for coaxial rotation within the chamber 38 by a splined output shaft 42 which is journalled in sealed bearings mounted in the heads 26 and 28, as best shown in FIG. 2. It is arranged for clockwise rotation within the housing as shown in FIGS. 3–6 and has a width substantially equal to the width of the engine block 24, as measured in an axial direction.

Two diametrically opposed lobes 44 and 46 on the rotor are separated by diametrically opposed pocket portions 48 and 50 which are formed in the rotor and which cooperate with the housing 12 to define the compression chamber 16 and the combustion chamber 18, as will be hereinafter further discussed. The lobes 44 and 46 are defined, in part, by portions of the peripheral surface of the rotor and have generally parti-cylindrical surfaces of some angular extent, respectively indicated at 52 and 54 and disposed in near engagement with the cylindrical wall of the bore 30. The pocket 48 which comprises the compression chamber 16 is defined by a portion of the peripheral surface of the rotor, indicated at 56, which curves arcuately inwardly along a generally spiral path from the parti-cylindrical surface portion 52. The pocket 48 is further defined by another surface 58 which is inclined to the radial direction and extends outwardly from the inner end of the surface 56 and in the direction of rotation. The surface portions 56 and 58 provide smooth surface transition between the parti-cylindrical peripheral surfaces of the lobes 44 and 46. The other pocket 50, which comprises the combustion chamber 18, is defined by a radially outwardly opening groove in the rotor. The groove has a generally rectangular cross-section as viewed in a radial plane and is defined by an arcuate inner wall 60 which has its center of curvature coincident with the axis of the rotor 14. The ends of the pocket 50 are formed by angularly spaced apart end walls 62 and 64 which are inclined to radial directions and diverge generally radially outwardly from opposite ends of the inner wall 60.

A fuel-air inlet passageway 65 formed in the rotor 14 has one end which opens through the surface 58 and another end which opens through the side wall of the rotor adjacent the head 28 for alignment with the intake slot 40 and the port 41 as the rotor rotates within the chamber 38.

The seal assemblies 20 and 22 are supported in angularly spaced relation within the housing 12 to define opposite ends of a firing region wherein the power stroke of the engine occurs. The seal assembly 20 comprises an inner seal member 66 and an outer seal member 68 supported on the housing within the recess 32 by a common pivot pin 70 for coaxial pivotal movement about a common axis parallel to the axis of the rotor 14 and relative to the housing 12. The inner and outer seal members 66 and 68 extend from the pivot pin 70 in the direction of rotor rotation.

Figure 4:
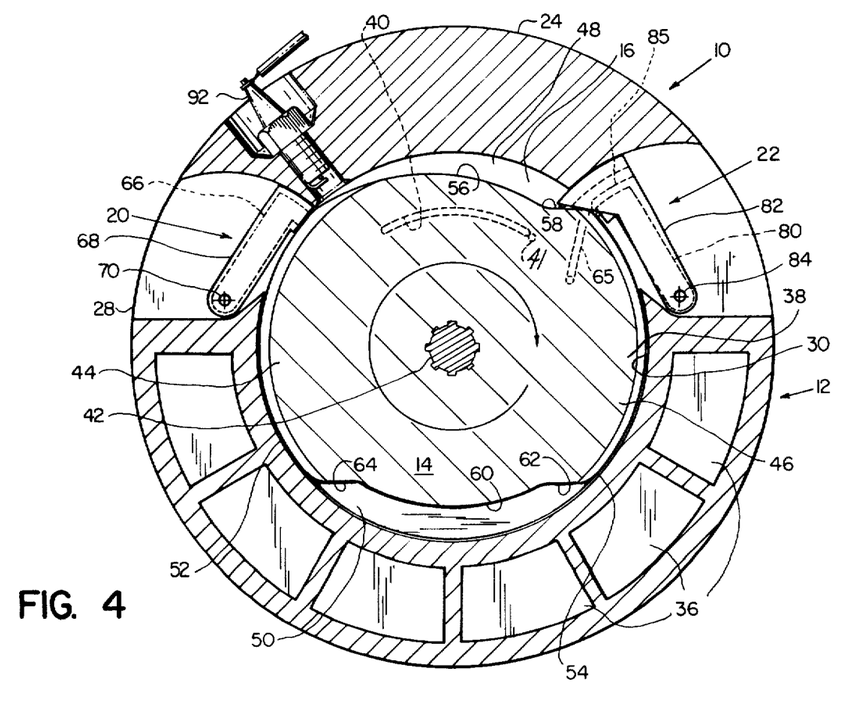
FIG. 4 is similar to FIG. 3, but shows the position of the rotor at the beginning of the compression cycle.
Figure 5:
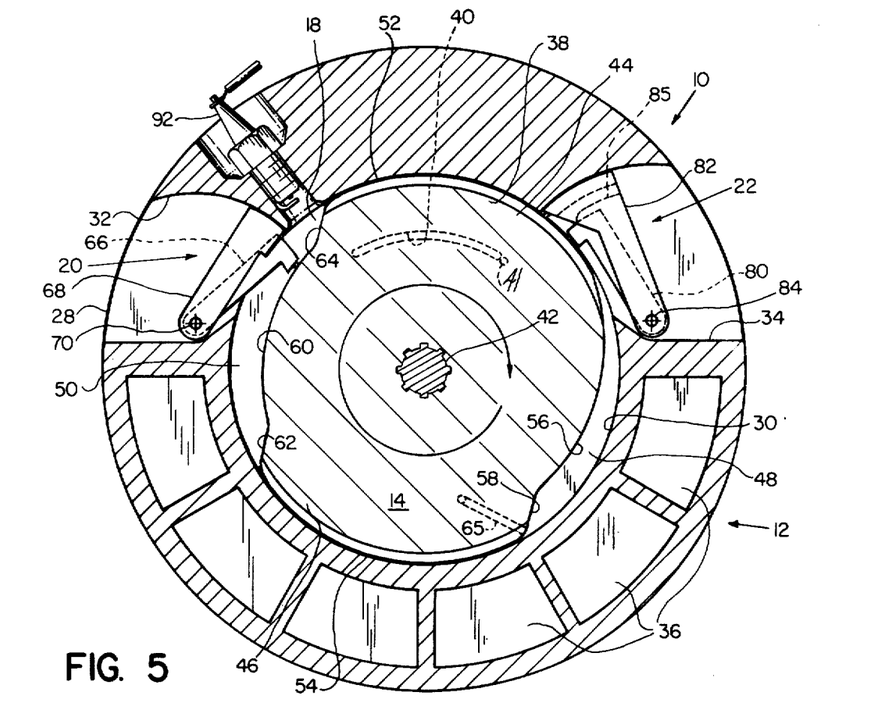
FIG. 5 is similar to FIG. 3, but shows the position of the rotor near the beginning of the ignition cycle.
Figure 6:
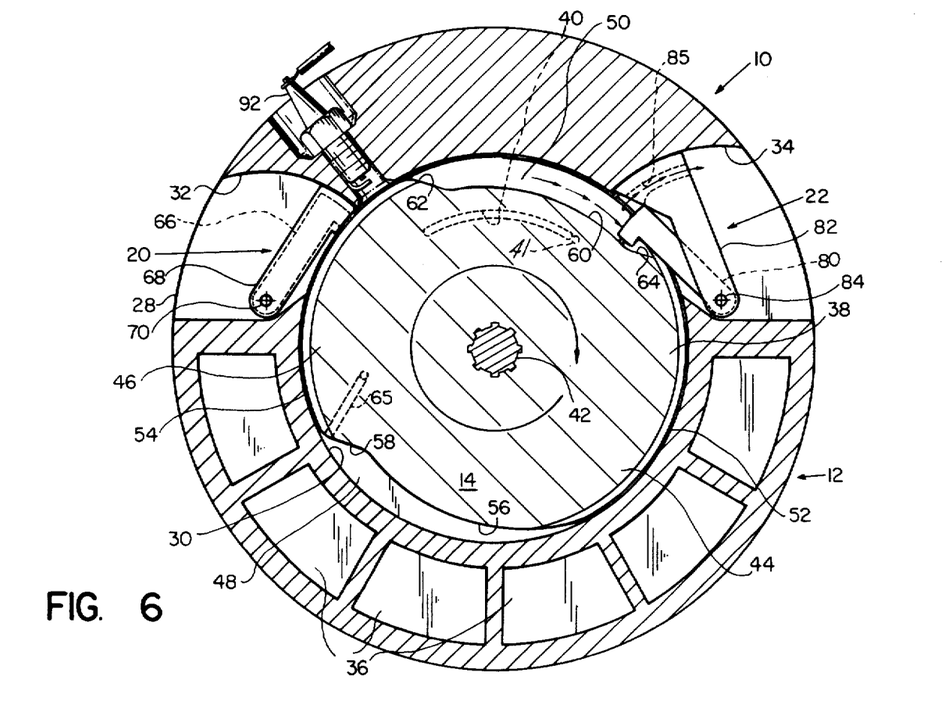
FIG. 6 is similar to FIG. 3 but shows the position of the rotor near the beginning of the exhaust cycle.

Referring now more particularly to FIGS. 6–8, the outer seal member 68 has an arcuate wall at its free end which has its radius of curvature centered on the axis of the pivot pin 70 and which complements an associated arcuate surface of the recess 32, as shown in FIGS. 3–6. The width of the outer seal member 68 is substantially equal to the width of the rotor 14. A sealing element or wiper 72 mounted on the outer seal member 68 near its free end is arranged for wiping engagement with the peripheral surface of the rotor 14 and associated side walls of the recess 32 and the chamber 38. The sealing element 72 and other sealing elements or wipers hereinafter further described are made from suitable material to withstand the high temperatures developed by ignition of fuel-air mixture within the combustion chamber 18.

The inner seal member 66 is received within and movable into and out of a recess 73 formed in the outer seal member 68. The free end of the inner seal member 66 is arcuately contoured to complement an associated arcuate wall of the recess 73. The inner seal member 66 has a width substantially equal to the width of the groove or channel 50. A sealing element or wiper 74 is mounted near the free end of the inner seal member and arranged for wiping engagement with associated portions of the side walls of the recess 73 and the side walls of the channel 50. A spring 76 acts between the housing and the outer seal member 68 to bias the outer seal member in clockwise direction about the pivot pin 70 and toward engagement with the rotor 14, as best shown in FIGS. 3–6. Another spring 78 disposed within the recess 73 acts between the outer seal member 68 and the inner seal member 66 to bias the inner seal member into engagement with the rotor 14.

The seal assembly 22 is similar in some respects to the seal asssembly 20, previously described, and has an inner member 80 and an outer member 82 supported for pivotal movement with the recess 34 and relative to the housing about a common pivot pin 84. The seal members 80 and 82 extend from the pin 84 in a direction opposite the direction of rotor rotation or in counterclockwise direction as viewed in FIGS. 3–6. At its free end the outer seal member 82 has an arcuate surface with its center of rotation coincident with the axis of the pivot pin 84. The latter surface complements an associated arcuate surface of the recess 34, as best shown in FIGS. 3–6. An exhaust port 85 extends through the free end portion of the outer seal member 82, as best shown in FIGS. 10 and 11. The width of the outer seal member 82 is substantially equal to the width of the rotor 14. A sealing element or wiper 86 mounted in the outer seal member 82 near its free end is arranged for wiping engagement with the peripheral surface of the rotor 14 and associated portions of the side walls of the recess 34 and Ff the chamber 38.

The inner seal member 80 is supported for pivotal movement into and out of a recess 88 in the outer seal member 82. The width of the inner seal member 80 is substantially equal to the width of the pocket 50. A sealing element or wiper 90 mounted near the free end of the inner seal member 80 is arranged for wiping engagement with the peripheral surface of the rotor 14 and associated surface portions of the pocket 50. The wiper 90 is further arranged for wiping or sealing engagement with associated surface portions of the recess 88 in which it is received and associated surfaces of the channel 50.

The ignition system for the engine 10 includes a spark plug 92, secured in a threaded aperture in the block 24 which communicates with the chamber 38 between the opposing free ends of the seal assemblies 20 and 22 and in close proximity to the seal member 20. A conventional timing mechanism (not shown) is or may be provided for firing the spark plug 92 in timed relation to rotation of the rotor 14, as will be hereinafter further discussed.

A fuel-air mixture is supplied to the engine 10 from a conventional carburetor (not shown) which is connected to the head 28 by a suitable conduit to supply fuel-air mixture to the chamber 38 through the intake slot 40.

The exhaust system for the engine includes the exhaust port 85 and the recess 34. Preferably, but not shown, a suitable exhaust conduit, which may be provided with a muffler, is connected to the engine block to receive the products of combustion exhausted from the recess 34.

The engine 10 is preferably cooled by a coolant liquid circulated through the cooling passageways 36, 36 and associated connecting passageways formed in the heads 26 and 28, but not shown. The cooling system is preferably a conventional closed loop system which may include a circulating pump, a radiator, and a radiator cooling fan arranged in a manner well known in the internal combustion engine art. The lubrication system for the engine 10 may also be of a conventional type.

Preferably, the engine 10 is started by an electrically operated starter motor (not shown) which rotates the output shaft 42 in clockwise direction, as it appears in FIGS. 3–6. At the beginning of the intake cycle, the rotor 14 is in its position of FIG. 3. One end of the fuel-air intake passageway 65 is in communication with one end of the arcuate intake slot 40. The other end of the intake passageway 65 is located just beyond the free end of the seal assembly 20. As the rotor 14 rotates in clockwise direction from its position of FIG. 3 toward its position of FIG. 4 the volume of the space within the firing region between the seal assemblies 20 and 22, as defined by the pocket 48 and an associated portion of the chamber 38, steadily increases. During this phase of rotor rotation the intake passageway 65 remains in communication with the intake slot 40 so that a proper fuel-air mixture, as provided by the carburetor (not shown), is drawn into the engine. After the passageway 65 moves out of communication with the intake slot 40 and while the volume of the pocket 48 is increasing, the passageway 65 moves into brief communication with the port 41 which is open to the atmosphere. Air is drawn into the pocket 48 through the port 41 and the passageway 65 whereby any fuel remaining within the passageway 65 is drawn into the pocket 48.

When the rotor 14 advances to its approximate position of FIG. 4, the compression cycle begins. It should be noted that the fuel-air intake passageway 65 is now out of communication with the intake slot 40. Further rotation of the rotor 14 in clockwise direction from its position of FIG. 4 decreases the volume of the space between the seal assemblies 20 and 22 whereby the fuel-air mixture trapped in this space is compressed.

When the rotor advances in clockwise direction to its position of FIG. 5, the power or ignition cycle commences. The sealing member 68 is disposed in sealing engagement with the outer peripheral surface of the rotor whereas the seal member 66 is biased into sealing engagement with associated portions of the surfaces of the pocket 50. The compressed fuel-air mixture trapped between the lobe 44 and the associated cylindrical surface of the chamber and within the firing region starts to expand into the portion of the pocket 50 ahead of the sealing assembly 20 and in the region of the spark plug 92, as the rotor appears in FIG. 5. At this point the spark plug is fired by the ignition timing system to ignite the trapped fuel-air mixture. The expanding gases of combustion produced by burning the fuel-air mixture act between the surface 64 of the rotor and the reaction surface on the free end of the inner seal member 66 to drive the rotor in clockwise direction. The expanding fuel-air mixture continues to burn throughout the ignition cycle. When the rotor 14 reaches its approximate position of FIG. 6 the exhaust cycle begins. During this phase of rotor rotation the sealing member 82 is in sealing engagement with the outer peripheral surface of the rotor 14 whereas the sealing member 80 is biased into the channel 50. The free ends of the sealing seal members 80 and 82 cooperate to provide a substantial barrier across the channel 50 whereby the gases of explosion are forced out through the exhaust port 85 and the recess 34. The inner seal member 80 which remains within the combustion chamber defined by the channel 50 exerts a scrubbing action upon the combustion chamber throughout the exhaust cycle to assure complete scavenging of gases from the combustion chamber. Thus, no substantial quantity of the products of combustion remain within the combustion chamber to dilute the fuel-air mixture which enters the chamber during the next intake cycle. Upon completion of the exhaust cycle the rotor 14 is in its position of FIG. 3 to commence the next intake cycle.

Figure 13:
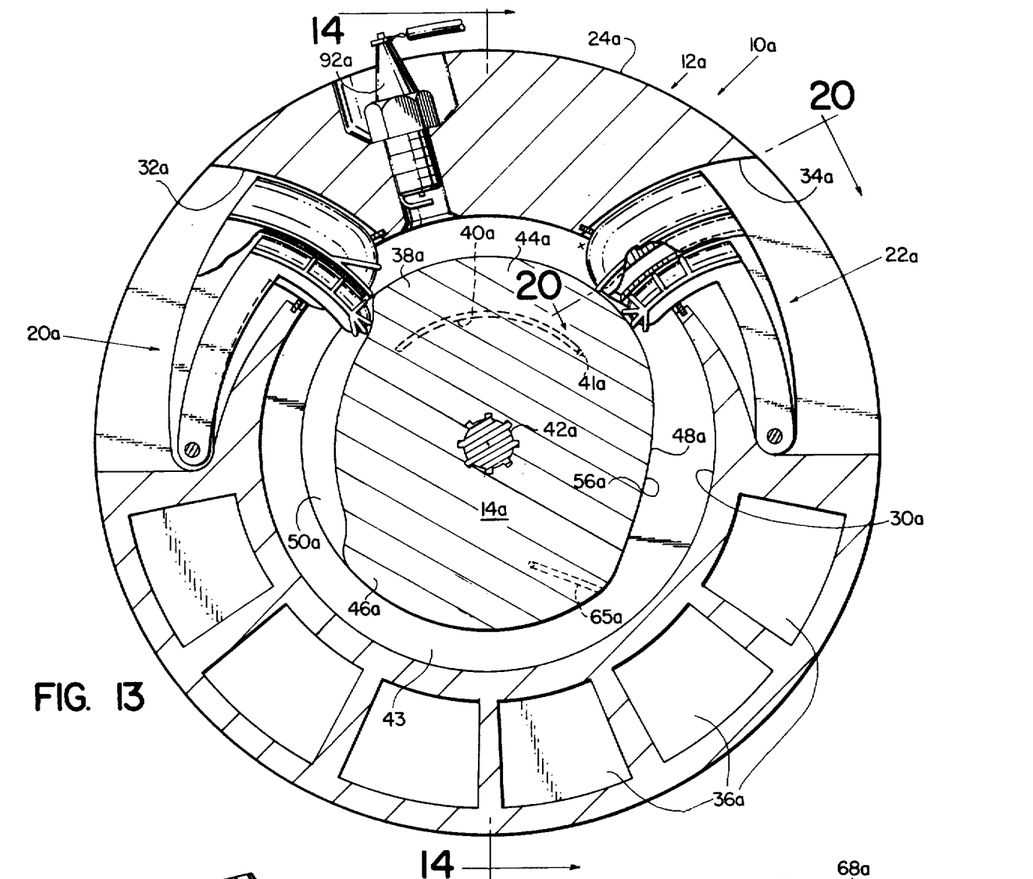
FIG. 13 is a somewhat schematic sectional view similar to FIG. 3, but shows another rotary internal combustion engine embodying the present invention.
Figures 14, 15, 16, 17, 18, 19, 20, 21, 22, 23, 24, 26, 27, 28:
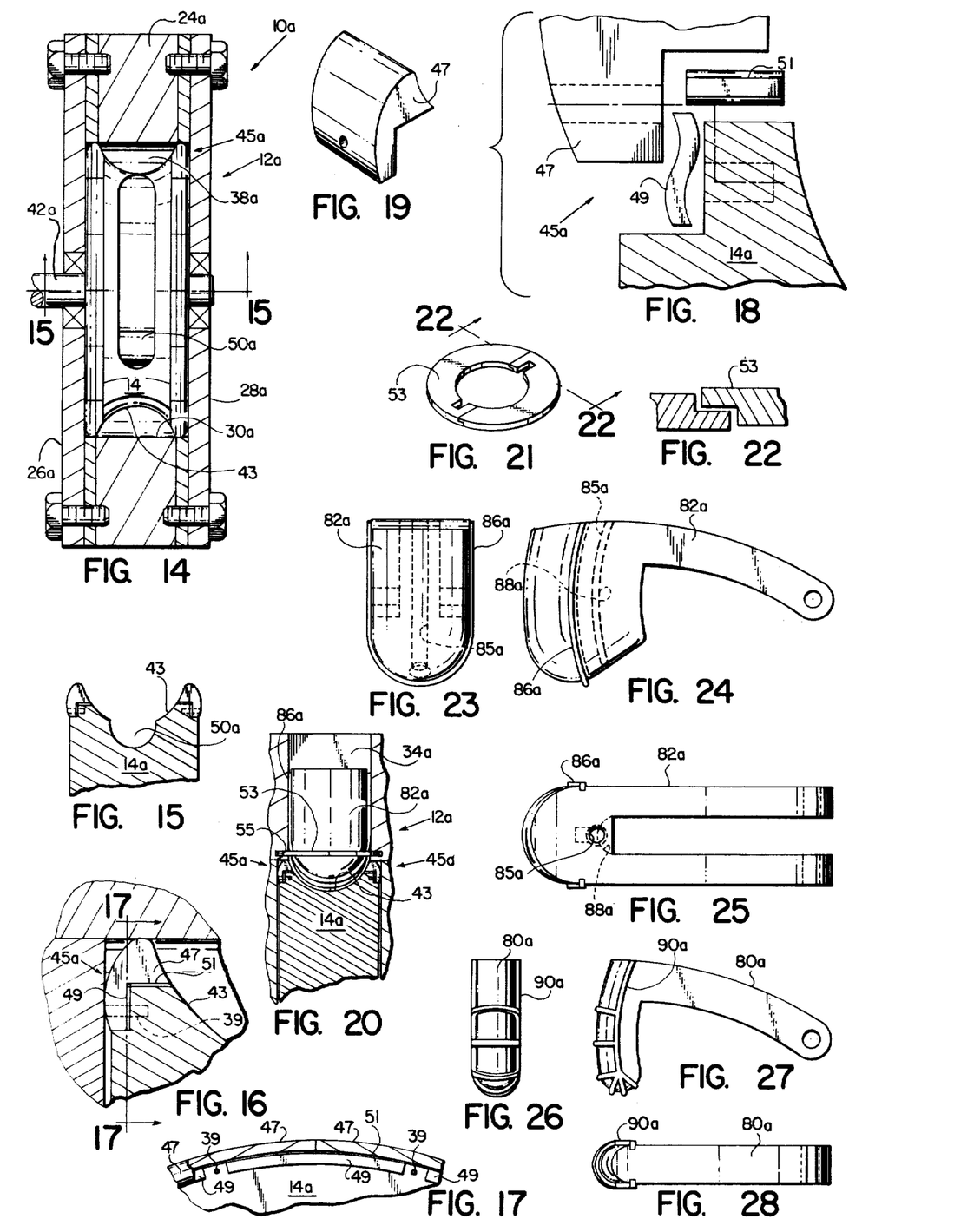
FIG. 14 is a sectional view taken along the line 14—14 of FIG. 13, the rotor being shown in full.
FIG. 15 is a fragmentary sectional view through the rotor taken along the line 15—15 of FIG. 14.
FIG. 16 is similar to FIG. 15 but shows a somewhat enlarged fragmentary sectional view through a portion of the rotor and housing.
FIG. 17 is a fragmentary sectional view taken along the line 17—17 of FIG. 16.
FIG. 18 is a somewhat further enlarged exploded fragmentary view of the rotor seal shown in FIG. 16.
FIG. 19 is a fragmentary perspective view of a segment of the rotor seal.
FIG. 20 is a somewhat enlarged fragmentary sectional view through the housing taken generally along the line 20—20 of FIG. 13, the seal assembly and ring seal being shown in full.
FIG. 21 is a perspective view of the ring seal shown in FIG. 20.
FIG. 22 is a somewhat enlarged fragmentary sectional view taken along the line 22—22 of FIG. 21.
FIG. 23 is a somewhat enlarged front elevational view of an outer exhaust seal member.
FIG. 24 is a side elevational view of the outer exhaust seal member of FIG. 23.
FIG. 26 is a front elevational view of an inner exhaust seal member.
FIG. 27 is a side elevational view of the inner exhaust seal member of FIG. 26.
FIG. 28 is a top view of the inner exhaust seal member, as shown in FIG. 27.

Referring now particularly to FIGS. 13 and 14, another rotary internal combustion engine embodying the present invention is indicated generally by the reference numeral 10a. The engine 10a is similar in many respects to the engine 10, previously described, but utilizes somewhat different rotor sealing arrangements. Parts of the engine 10a which correspond to parts previously described bear the same reference numerals as the previously described parts and a letter "a" suffix.

In outward appearance the engine 10a is substantially identical to the engine 10, shown in FIG. 1, and has a housing or block assembly, indicated generally at 12a, and a rotor, indicated generally at 14a, supported for rotation within the housing. The engine 10a also includes angularly spaced seal assemblies, indicated generally at 20a and 22a, supported within recesses in the housing 12a, and biased into sealing engagement with the rotor 14a. The seal assemblies cooperate with the rotor 14a and the housing 12a to alternately define compression and combustion chambers as the rotor rotates in clockwise direction within the housing 12a, as it appears in FIG. 13.

Like the engine 10, the engine 10a is a four-cycle engine. Separate intake, compression, power and exhaust cycles occur during each complete revolution of the rotor 14a. The engine 10a defines a single compression chamber and a single combustion or firing chamber during each complete revolution of the rotor. However, it will be apparent that the engine may be arranged to provide additional compression and combustion chambers so that a plurality of power cycles occur during each revolution of the rotor.

Further referring to FIGS. 13 and 14, the housing assembly 12a comprises a generally cylindrical engine block 24a which has a cylindrical bore 30a. The housing assembly further includes two heads or end plates 26a and 28a fastened in sealing engagement with opposite sides of the block 24a, substantially as shown in FIG. 14.

Angularly spaced recesses 32a and 34a formed in the engine block 24a communicate with the bore 30a for containing the seal assemblies 20a and 22a, as will be hereinafter further discussed. Cooling passageways 36a, 36a are also formed in the housing assembly to facilitate circulation of cooling fluid within the engine block in the manner well known in the art. The heads 26a and 28a and the block 24a cooperate to define a generally cylindrical chamber 38a which contains the rotor 14a. An arcuate intake slot 40a which extends through the head 28a in a region between the recesses 32a and 34a communicates with the chamber 38a for supplying fuel and air mixture to the engine 10a, in the manner generally aforedescribed with reference to the engine 10. Like the engine 10, the engine 10a also has a port 41a which opens through the head 28a and communicates with the chamber 38a and the atmosphere. A splined output shaft 42a journalled in bearings mounted in the heads 26a and 28a supports the rotor 14a for coaxial rotation within the housing 38a, as best shown in FIG. 14.

Considering now the rotor 14a, it is generally cylindrical and has a circumaxial annular groove 43 which defines a portion of its peripheral surface. The groove 43 opens radially outwardly and has a generally arcuate cross-section as viewed in a radial plane of the rotor, and as best shown in FIGS. 14 and 15. Two diametrically opposed lobes 44a and 46a are separated by diametrically opposed pocket portions 48a and 50a and which cooperate with a portion of the housing 12a between the seal assemblies 20a and 22a to alternately define a compression chamber and a combustion chamber, in the same manner in which the rotor 14 of the engine 10 cooperates with the housing assembly 12 and the seal assemblies 20 and 22 to alternately define the compression chamber 16 and the combustion chamber 18 as the rotor 14 rotates within its housing 12.

The lobes 44a and 46a are defined, in part, by portions of the groove surface 43 and are of some angular extent. The latter surfaces are indicated at 52a and 54a. The pocket 48a which comprises the compression chamber is defined by a surface 56a which curves generally arcuately outwardly from the lobe 44a toward the lobe 46a. The pocket, which comprises the combustion chamber is formed by a recess or channel 50a in the rotor 14a which opens radially outwardly through the annular groove 43. The pocket 50a has a generally arcuate cross-section, as viewed in a radial plane of the rotor, as shown in FIG. 15.

The rotor 14a has a fuel-air inlet passageway 65a, one end of which opens through the surface 56a. The opposite end of the passageway 65a opens through the side wall of the rotor adjacent the head 28a and is aligned with the intake slot 40a and the port 41 during a portion of each rotation of the rotor within the chamber 38a.

Rotor seal assemblies, indicated generally at 45, 45 in FIG. 14, are provided for effecting sealing engagement between the circular peripheral edges at opposite sides of the rotor and the housing 12a. Referring now particularly to FIGS. 16-19, a typical rotor seal assembly 45 comprises a plurality of arcuate rotor seal segments 47, 47 which define one peripheral side edge of the rotor 14a as best shown in FIGS. 14 and 16. The arcuate segments 47, 47 which comprise the rotor seal assembly 45 are biased in both axially and radially outward directions relative to the rotor body to engage the bore wall 30a and associated end wall of the chamber 38a. More specifically, each rotor seal segment 47 is held loosely in position by at least one associated pin 39 mounted in the rotor body and projecting in an axial direction from it as best shown in FIG. 16. A series of arcuately shaped wave springs 49, 49 trapped between adjacent pins 39, 39 and between the rotor body and the seal segments 47, 47 bias the segments in axially outward directions and into engagement with an associated side wall of the chamber 38a. An annular wave washer 51 which coaxially surrounds the rotor body acts between the rotor body and the rotor seal segments 47, 47 to bias the latter segments radially outward and into engagement with the bore wall 30a, as best shown in FIG. 16.

Further referring to FIG. 13, the seal assemblies 20a and 22a pivotally supported on the housing 12a in the recesses 32a and 34a, respectively to define opposite ends of the compression and combustion chambers. The firing seal assembly 20a includes an inner seal member 66a and an outer seal member 68a shown in FIGS. 29-34 and pivotally supported on the housing 14a within the recess 32a by a common pivot pin 70a. The seal members 66a and 68a extend from the pivot pin and in the direction of rotor rotation, as shown in FIG. 13.

Figures 29, 30, 31, 32, 33, 34:
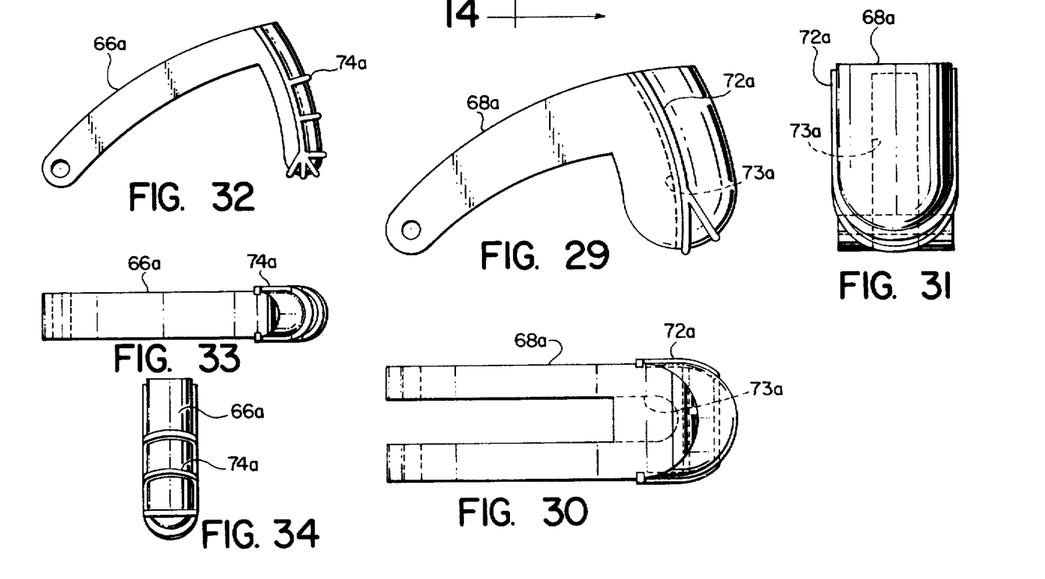
FIG. 29 is a somewhat enlarged side elevational view of an outer firing seal member.
FIG. 30 is a top view of the outer firing seal member of FIG. 29.
FIG. 31 is a front elevational view of the outer firing seal member of FIG. 29.
FIG. 32 is a somewhat enlarged side elevational view of an inner firing seal member.
FIG. 33 is a top view of the inner firing seal member of FIG. 32.
FIG. 34 is a front elevational view of the inner firing seal member of FIG. 32.

Referring first to FIGS. 29-31, the outer firing seal member 68a includes a free end poriton which has a radius of curviture, centered on the axis of the pivot pin 70a, and a generally pari-circular cross-section, as best shown in FIG. 30, which complements an associated surface of the recess 32a. A recess 73a is formed in the outer seal member to receive the inner seal member 66a as will be hereinafter further discussed. The free or sealing end of the outer firing seal member 68a is rounded to generally complement the curvature of the annular groove 43 and is preferably pari-spherical, substantially as shown. The width of the outer seal member 68a is substantially equal to the width of the groove 43.

A wiper or sealing member 72a is mounted in the outer seal member 68a near its free end and arranged for wiping engagement with the surface of the groove 43 and associated side walls of the recess 32a. A portion of the wiper 72a, which is disposed within the groove 43, is bifurcated and includes two generally U-shaped portions. This bifurcated arrangement of the wiper compensates for eccentricity of the groove 43 and assures that at least one bifurcated portion of the wiper 72a is in sealing engagement with a peripheral surface portion of the rotor defined by the groove 43 during each full rotation of the rotor 14a.

At least one annular ring seal 53, such as shown in FIG. 21, is disposed within the recess 32a in sealing engagement with the wall of the recess and in surrounding sealing engagement with the free end portion of the outer firing seal member 68a. The ring seal 53 is preferably retained within an associated groove 55 formed in the engine block 24a and opening into the recess 32a, as shown in FIG. 20. To facilitate assembly, the ring seal 53 is preferably diametrically split with overlapping end portions, as best shown in FIG. 22. The ring seal 53 is notched to receive the wiper 72a carried by the outer sealing member. Thus, the ring seal 53 and the associated firing seal assembly 20a which moves through it cooperate to form an effective seal between the chamber 38a and the recess 32a.

The inner seal member 66a, shown in FIGS. 32-34, is received within and movable into and out of the recess 73a in the outer seal member 68a. The free or sealing end portion of the inner seal member has a generally circular cross-section which complements an associated arcuate wall of the recess 73a. The width of the inner seal member 66a is substantially equal to the width of the pocket 50a which comprises the combustion or firing chamber. The sealing end portion of the inner seal member 66a is preferably parti-spherical to complement the parti-circular cross-section of the pocket 50a. A sealing element or wiper 74a is mounted on the sealing end poriton of the inner seal member and arranged for wiping engagement with associated portions of the side wall of the recess 73 and the wall of the pocket 50a. The sealing end portion of the wiper 74a is bifurcated to compensate for eccentricity of the wall of the pocket 50a so that at least one bifurcated portion of the wiper 74a is in sealing engagement with an associated wall of the pocket at all times while the inner sealing member 66a is disposed within the pocket 50a. Preferably, a spring (not shown) acts between the housing 12a and the outer seal member 68a to bias the latter seal member in clockwise direction about its pivot pin 70a and toward engagement with the peripheral surface of the rotor 14a, as it appears in FIG. 13. Another spring 78a located within the recess 73a acts between the outer seal member 68a and the inner seal member 66a to bias the inner member into sealing engagement with the rotor 14a.

In some respects, the exhaust seal assembly 22a is similar to the firing seal assembly 20a, previously described. It includes an inner seal member 80a and an outer seal member 82a supported within the recess 34a to pivot about a common pivot pin 84a. The seal assembly 22a extends from the pivot pin 84a and in a direction opposite the direction of rotor rotation, as shown in FIG. 13. The outer exhaust seal member 82a, best shown in FIGS. 23-25, is similar in shape to the outer seal member 68a, previously described and is also arranged for sealing engagement with the rotor 14a within the annular groove 43. It has a recess 88a for receiving the inner seal member 80a and carries a sealing element or wiper 86a for engaging the surface of the groove 43 and associated portions of the side walls of the recess 34a. At least one ring seal, substantially identical to the ring seal 53 previously described, is disposed within a groove 55 in the wall of the recess 34a and surrounds the outer seal member 82a. An exhaust port 85a extends through the free end of the outer exhaust seal member 82a, substantially as shown.

The inner seal member 80a is supported for pivotal movement into and out of the recess 88a in the outer seal member 82a and has a width substantially equal to the width of the pocket 50a. A sealing element or wiper 90a, mounted at the free or sealing end of the inner seal member 80a, is arranged for wiping engagement with the surface of the groove 43 and sealing engagement with associated portions of the surface of the pocket 50a. The free end portion of the wiper 90a is bifurcated to compensate for the eccentricity of the surface of the pocket 50a so that at least one portion of the bifurcated end of the wiper 90a is in sealing engagement with an associated surface of the pocket at all times while the wiper is disposed within the pocket 50a.

The carburation system which supplies fuel-air mixture to the engine 10 through the intake slot 40a is, or may be of conventional type. The ignition, cooling, exhaust and lubrication systems utilized by the engine 10a also are or may be conventional, as generally discussed with reference to the previously described engine 10. The operational cycle of the engine 10a is substantially identical to the operational cycle of the engine 10 and, therefore, need not be further described.

I claim:

1. A rotary internal combustion engine having a stationary block assembly defining a cylindrical chamber, a rotor supported for coaxial rotation within the chamber and having angularly spaced lobes and angularly spaced pockets separated by said lobes, one of said pockets being defined by a portion of the peripheral surface of said rotor, another of said pockets being defined by a radially outwardly opening channel formed in said rotor, a plurality of angularly spaced seal assemblies pivotally supported within recesses in said block assembly and having sealing surfaces engaging said rotor, each of said seal assemblies including inner and outer seal members, said inner seal members being pivotally movable relative to said outer seal members and being movable into and out of said channel and sealingly engageable with associated walls of said channel as said rotor rotates within said cylindrical chamber, and biasing means for urging said seal assemblies toward sealing engagement with said rotor.

2. A rotary internal combustion engine as set forth in claim 1 wherein each of said lobes has a parti-cylindrical surface.

3. A rotary internal combustion engine as set forth in claim 2 wherein said one pocket is defined by a first arcuate surface portion of said peripheral surface curving arcuately inwardly along a generally spiral path and in the direction of rotor rotation from said parti-cylindrical surface portion of one of said lobes and another surface inclined to the radial direction and extending outwardly from the inner end of said first arcuate portion and terminating at a junction with said parti-cylindrical surface portion of another of said lobes.

4. A rotary internal combustion engine as set forth in claim 1 wherein said rotor has a radially outward opening circumaxial annular groove defining at least a portion of said peripheral surface.

5. A rotary internal combustion engine as set forth in claim 4 wherein each of said lobes is defined by portions of the surface of said groove.

6. A rotary internal combustion engine as set forth in either claim 4 or claim 5 wherein said one pocket is defined by a portion of the surface of said groove.

7. A rotary internal combustion engine as set forth in any one of claims 1 through 5 wherein said channel is partially defined by an arcuate surface of said rotor having its center of curvature generally coincident with the axis of said rotor and generally opposing angularly spaced apart end walls diverging outwardly from opposite ends of said arcuate surface.

8. A rotary internal combustion engine as set forth in claim 1 wherein said inner and outer seal members of each of said seal assemblies are supported to pivot about a common axis.

9. A rotary internal combustion engine as set forth in claim 8 wherein said common axis is parallel to the axis of said rotor.

10. A rotary internal combustion engine as set forth in claim 8 or claim 9 wherein said engine includes at least one annular ring seal disposed in sealing engagement with the wall of an associated one of said recesses and in surrounding sealing engagement with an associated outer seal member, said associated outer seal member being movable relative to said annular ring seal.

11. A rotary internal combustion engine as set forth in claim 10 wherein said annular ring seal is received within an annular groove in said block assembly.

12. A rotary internal combustion engine as set forth in claim 11 wherein said annular ring seal is further characterized as a split ring.

13. A rotary internal combustion engine as set forth in any one of claims 1, 8 or 9 wherein each of said inner seal members is received within a recess within an associated outer seal member.

14. A rotary internal combustion engine as set forth in any one of claims 1, 8 or 9 wherein at least one of said seal assemblies has an exhaust passageway extending therethrough and communicating with said chamber and the atmosphere.

15. A rotary internal combustion engine as set forth in claim 14 wherein said exhaust passageway extends through the outer member of said one seal assembly.

16. A rotary internal combustion engine as set forth in claim 1 including rotor sealing means for sealing peripheral portions of the said rotor in engagement with at least one wall of said chamber.

17. A rotary internal combustion engine as set forth in claim 16 wherein said chamber has a cylindrical wall and said rotor sealing means is carried by said rotor and sealingly engageable with said cylindrical wall.

18. A rotary internal combustion engine as set forth in claim 16 or claim 17 wherein said chamber has radially disposed end walls and said rotor sealing means is carried by said rotor and sealingly engageable with said end walls.

19. A rotary internal combustion engine as set forth in claim 16 wherein said rotor sealing means comprises a plurality of sealing elements carried by said rotor and means for biasing said sealing means outwardly away from said rotor in at least one direction.

20. A rotary internal combustion engine as set forth in claim 19 wherein said rotor has a body and said sealing elements comprise arcuate segments carried by said body and defining peripheral edges of said rotor.

21. A rotary internal combustion engine as set forth in claim 19 wherein said one direction is a radial direction.

22. A rotary internal combustion engine as set forth in claim 20 or claim 21 wherein said one direction is an axial direction.

23. A rotary internal combustion engine as set forth in claim 19 wherein said means for biasing said rotor sealing means urges said segments outwardly away from said rotor and in both radial and axial directions toward sealing engagement with associated walls of said chamber.

24. A rotary internal combustion engine as set forth in claim 19 or claim 23 wherein said means for biasing said rotor sealing means comprises wave springs.

25. A rotary internal combustion engine having a stationary engine block assembly defining a cylindrical chamber, a rotor journalled for coaxial rotation within said cylindrical chamber and having a pair of generally diametrically opposed lobes and a pair of generally diametrically opposed pockets separated by said lobes and cooperating with the walls of said cylindrical chamber to define compression and combustion chambers, as said rotor rotates within said chamber each of said lobes having a parti-cylindrical surface defined by a portion of the peripheral surface of said rotor, one of said pockets being defined by a portion of the peripheral surface of said rotor including a first arcuate surface portion of said peripheral surface curving arcuately inwardly along a generally spiral path and in the direction of rotor rotation from said parti-cylindrical portion of one of said lobes and another portion of said peripheral surface inclined to the radial direction and extending outwardly from said first arcuate portion and terminating at a junction with said parti-cylindrical surface portion of the other of saib lobes, said other pocket being defined by a channel in said rotor, said channel having an inner wall defined by a second arcuate surface having its center of curvature coincident with the axis of said rotor and opposite end walls diverging outwardly from said inner wall, each of said end walls terminating at said parti-cylindrical surface of an associated one of said lobes, a pair of angularly spaced seal assemblies, each of said seal assemblies being pivotally supported within an associated recess in said engine block assembly and including inner an outer seal members supported for pivotal movement about a common pivotal axis parallel to the axis of said rotor, one of said seal assemblies extending from its pivotal axis in the direction of rotor rotation, the other of said seal assemblies extending from its pivotal axis in a direction opposite the direction of rotor rotation, said inner seal members being sealingly engageable with associated portions of the surface of said channel as said rotor rotates within said cylindrical chamber, and means for biasing said seal assemblies into sealing engagement with said rotor.

26. A rotary internal combustion engine as set forth in claim 25 wherein one of said seal assemblies has an exhaust passageway therethrough communicating with said cylindrical chamber and the atmosphere.

27. A rotary internal combustion engine as set forth in claim 26 wherein said exhaust passageway is disposed within said outer seal member of said one seal assembly.

28. A rotary internal combustion engine as set forth in claim 1 or claim 25 wherein said rotor has a fuel-air intake passageway which extends through it and has one end thereof communicating with one of said pockets and said block has a coaxial arcuate fuel-air intake slot which communicates with the other end of said passageway during a portion of each rotation of said rotor within said chamber.

29. A rotary internal combustion engine as set forth in claim 28 wherein said engine includes another port separated from said one port and which extends through said block to communicate with said chamber and with the atmosphere and said other end of said passageway communicates with said other port during a portion of each rotation of the rotor within said chamber.

30. A rotary internal combustion engine as set forth in claim 28 wherein said block assembly includes an engine block and heads disposed at axially opposite ends of said engine block and said fuel-air intake slot is formed in one of said heads.

31. A rotary internal combustion engine having a stationary block assembly defining a cylindrical chamber, a rotor supported for coaxial rotation within the chamber and having angularly spaced lobes and angularly spaced pockets separated by said lobes, each of said lobes having a parti-cylindrical surface disposed in near engagement with the cylindrical wall of said chamber, one of said pockets being defined by a portion of a peripheral surface of said rotor, another of said pockets being defined by a channel formed in said rotor and opening radially outwardly through said peripheral surface, said rotor having a fuel-air intake passageway extending therethrough and having one end thereof communicating with one of pockets, said block having a coaxial arcuate fuel-air intake slot which communicates with the other end of said passageway during a portion of each rotation of said rotor within said chamber, a plurality of angularly spaced seal assemblies pivotally supported within recesses in said block assembly, each of said seal assemblies including an inner seal member and an outer seal member and having sealing surfaces engaging said rotor and associated portions of the walls of said recesses, said inner seal member engaging said rotor within said channel during a portion of each rotation of said rotor and biasing means for urging said seal assemblies toward sealing engagement with said rotor.

32. A rotary internal combustion engine as set forth in claim 31 including another port extending through said block and communicating with said chamber and with the atmosphere, said other end of said passageway communicating with said other port during a portion of each rotation of the rotor within said chamber.

33. A rotary internal combustion engine as set forth in either claim 31 or claim 32 wherein said block assembly includes an engine block having a cylindrical bore and heads at axially opposite ends of said bore cooperating with said bore to define said chamber and said fuel-air intake slot is formed in one of said heads.

* * * * *